(No Model.)

F. W. GORDON.
DEVICE FOR TRANSMITTING ROTARY MOTION.

No. 478,959. Patented July 12, 1892.

Witnesses:
M. S. Belden
L. G. Curtis

Frederick W. Gordon
Inventor
by James W. See
Attorney

UNITED STATES PATENT OFFICE.

FREDERICK W. GORDON, OF PHILADELPHIA, PENNSYLVANIA, ASSIGNOR TO THE PHILADELPHIA ENGINEERING WORKS, LIMITED, OF SAME PLACE.

DEVICE FOR TRANSMITTING ROTARY MOTION.

SPECIFICATION forming part of Letters Patent No. 478,959, dated July 12, 1892.

Application filed August 13, 1891. Serial No. 402,510. (No model.)

*To all whom it may concern:*

Be it known that I, FREDERICK W. GORDON, of Philadelphia, Philadelphia county, Pennsylvania, have invented certain new and useful Improvements in Devices for Transmitting Rotary Motion, (Case A,) of which the following is a specification.

My invention will be readily understood from the following description, taken in connection with the accompanying drawings, in which—

Figure 1:
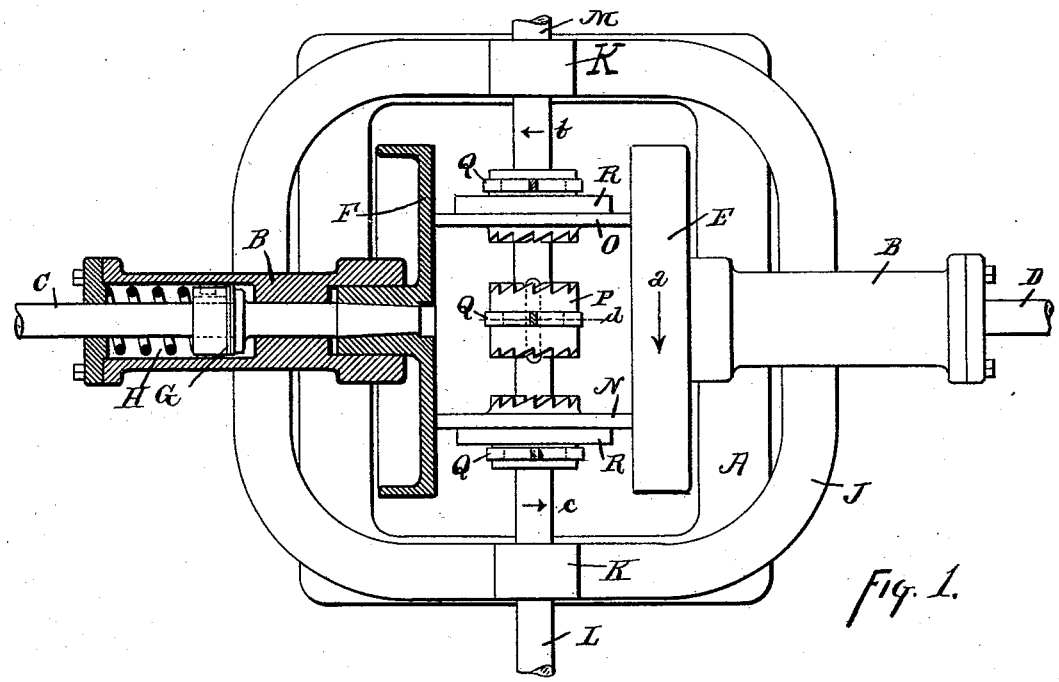
Figure 2:
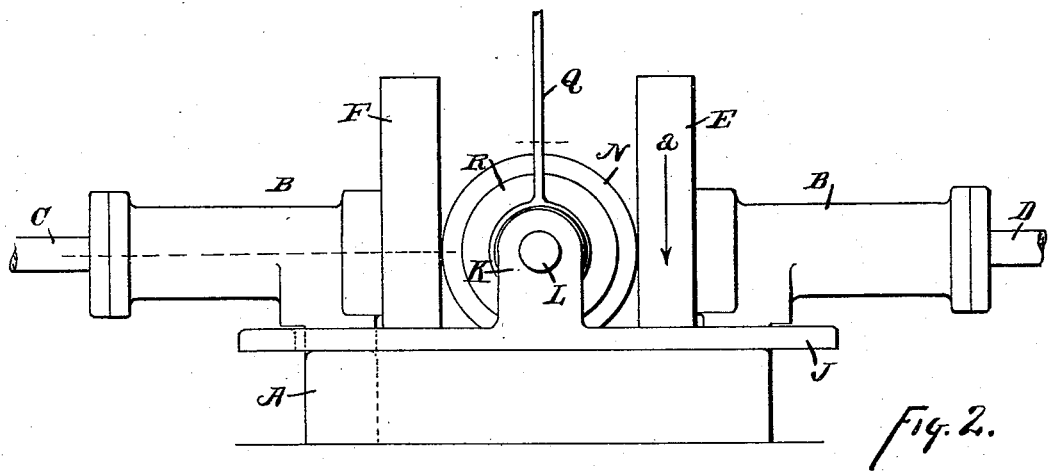

Figure 1 is a plan part horizontal section of a device exemplifying my present improvements, and Fig. 2 a side elevation of the same.

In the drawings, A indicates a frame; B, two bearings supported thereby; C, a shaft journaled in one of these bearings; D, a shaft journaled in the other bearing; E, a flat-faced disk fast on shaft D; F, a similar disk fast on shaft C, the two disks presenting their faces toward and parallel with each other; G, a thrust-bearing on each of the shafts, (one only being exposed;) H, a spring behind each thrust-bearing and serving to meet the thrusts of the disks and to urge the disks toward each other; J, a second frame; K, two bearings supported thereby in a common axial line disposed midway between the two disks and parallel to their faces and in the plane of their axes; L, a shaft journaled in one of these bearings, or, if desired, as hereinafter explained, in both the bearings; M, a shaft journaled in the other bearing and forming either an integral or separate prolongation of the shaft L, the separation, if the shafts are separate, being at line $d$; N, a disk loose on shaft L and adapted for longitudinal movement thereon and having the opposite portions of its periphery engaging the disks E and F; O, a similar disk similarly arranged on the shaft M, the disks N and O being hereinafter termed the "brush-wheels" to distinguish them from the disks E and F; P, a clutch splined to the shaft L M, assuming this shaft to be integral, the teeth upon the opposite faces of this clutch being oppositely inclined and adapted to engage corresponding clutch-teeth upon the brush-wheels; Q, shifters for sliding the brush-wheels and clutch upon their shaft or shafts, and R pulleys upon the brush-wheels and serving merely to exemplify means by which rotary motion may be imparted to or from the two brush-wheels independently.

Assume L and M to form an integral shaft from which motion is to be taken and assume continuous rotary motion at uniform velocity to be given to shaft D in the direction of arrow $a$. Under such circumstances brush-wheel N will revolve idly in the direction of arrow $c$ and brush-wheel O will revolve idly in the direction of arrow $b$ and shaft L M will be stationary. Assuming the brush-wheels to be equidistant from the center of the disks, the brush-wheels will revolve at equal velocities. If the clutch be thrown into engagement with brush-wheel O, the driven shaft L M will revolve in the direction of arrow $b$. If the clutch be thrown into engagement with the other brush-wheel, the driven shaft will revolve in the direction of arrow $c$. If brush-wheel O be moved inwardly nearer the center of the disks, it will have its speed of rotation decreased. In such case the throwing of the clutch from one brush-wheel to the other will cause the driven shaft to change both its direction and velocity of rotation, and the adjustment of the two brush-wheels to and from the center of the disks provides for securing any desired relationship between the forward and backward velocities of the driven shaft. The velocities of the driven shaft may be changed while the shaft is in motion by shifting whichever brush-wheel may be engaged by the clutch. A brush-wheel may be set well in toward the center of the disks, so that its motion will be very slow, and then the clutch may be engaged with it, thus initiating the motion of the driven shaft at low speed, after which the brush-wheel may be moved outwardly to increase the speed. The application may, if desired, be reversed and power may be applied to the shaft L M and the shaft D employed as the driven shaft.

While the motions are thus transmitted between the disks and brush-wheels the disk F has acted as an idle abutment-disk to resist the side-springing of the shaft L M, the brush-wheels being pinched between the disks. Shaft C has been without office and might be omitted. The springs H furnish yielding thrust-bearings, which hold the disks to their work upon the brush-wheels with elastic pressure. When one of the brush-wheels is transmitting motion to the shaft L M, the other brush-wheel rotates idly; but its presence serves in equalizing the strains upon the disks, the strains due to the pinching pressure of the disks being therefore in a direct axial line. The two frames are independent of each other and capable of movement with reference to each other, and the disks being carried by one frame and the brush-wheels by the other frame the two axial lines can shift with reference to each other, so that the shaft L M will not interfere with the brush-wheels accommodating themselves to the disks between which they are pinched.

The shaft L M has been assumed as a single driven or driving shaft and the clutch a mere means for engaging the two brush-wheels alternatively with the shaft. The shaft may, if desired, be a mere idle pivot-shaft, and the motions may be transmitted to or from the brush-wheels by means of the pulleys R, and in this connection it is to be understood that a toothed gear is the equivalent of a pulley. In thus taking the motions direct from the brush-wheels by the pulleys R the shaft need not turn and the clutch need not be present; or instead of taking the motions direct from the brush-wheels or employing the clutch each brush-wheel may be fast on its individual shaft, the two shafts being separate. In this case the motions may be taken from or given to the shafts L M by pulleys or other transmitting mechanism attached to them, the two shafts thus transmitting rotations in opposite directions and at rates of speed determined by the position of the respective brush-wheels.

The effect upon shaft C, if such shaft be employed, is obvious. Its motions respond to that of shaft D, but in a reverse direction. Cases may arise in the use of this system where both shafts C and D would be useful, and cases may arise where but one of them will be needed, and cases may arise in which neither of them will be needed. By omitting both of them the two disks become merely mediums for transmitting motion from one of the brush-wheels to the other, whereby motion applied to one of the brush-wheels becomes transmitted through the disks to the other brush-wheels in a reversed direction and at a modifying velocity.

The device is well adapted for driving hoisting apparatus or for driving machine-tools.

I claim as my invention—

1. In a device for transmitting rotary motion, the combination, substantially as set forth, of a shaft, two brush-wheels of equal diameter thereon and provided with means for transmitting rotary motion to or from them, two flat-faced disks arranged in a common axial line and engaging opposite sides of both said brush-wheels and adapted for motion lengthwise of their axes, thrust-bearings with yielding pressure, means adapted to press the disks to the brush-wheels, and mechanism for adjusting independently the points of engagement between the two brush-wheels and disks.

2. In a device for transmitting rotary motion, the combination, substantially as set forth, of a frame, two flat-faced disks journaled therein in a common axial line, thrust-bearings and pressure means for urging the disks toward each other, a second frame adapted for independent self-adjusting motion with reference to the first frame, a shaft journaled in said second frame at right angles to the axial line of said disks, two brush-wheels on said shaft, and means for transmitting rotary motion to and from said brush-wheels.

FREDERICK W. GORDON.

Witnesses:
RICHARD G. LODGE,
JAMES McLAUGHLIN.